Oct. 14, 1952  J. D. RUST  2,613,492
COTTON PICKING MACHINE
Filed Oct. 25, 1948  5 Sheets-Sheet 1

Inventor,
John D. Rust,
By
Albert E. Dieterich,
ATTORNEY.

Oct. 14, 1952  J. D. RUST  2,613,492
COTTON PICKING MACHINE
Filed Oct. 25, 1948  5 Sheets-Sheet 2
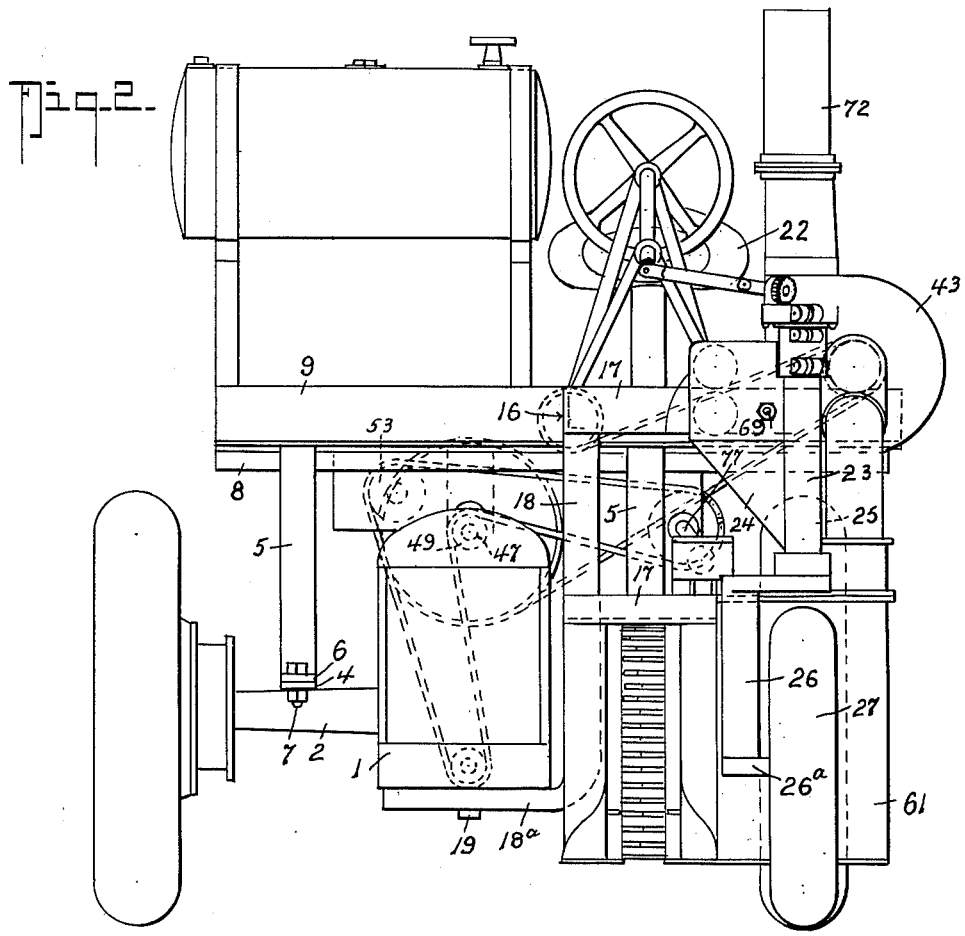
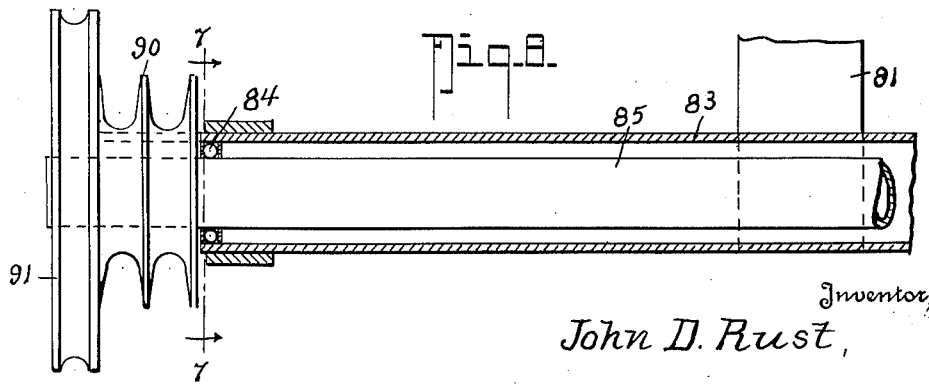
Inventor,
John D. Rust,
By Albert E. Dieterich,
ATTORNEY.

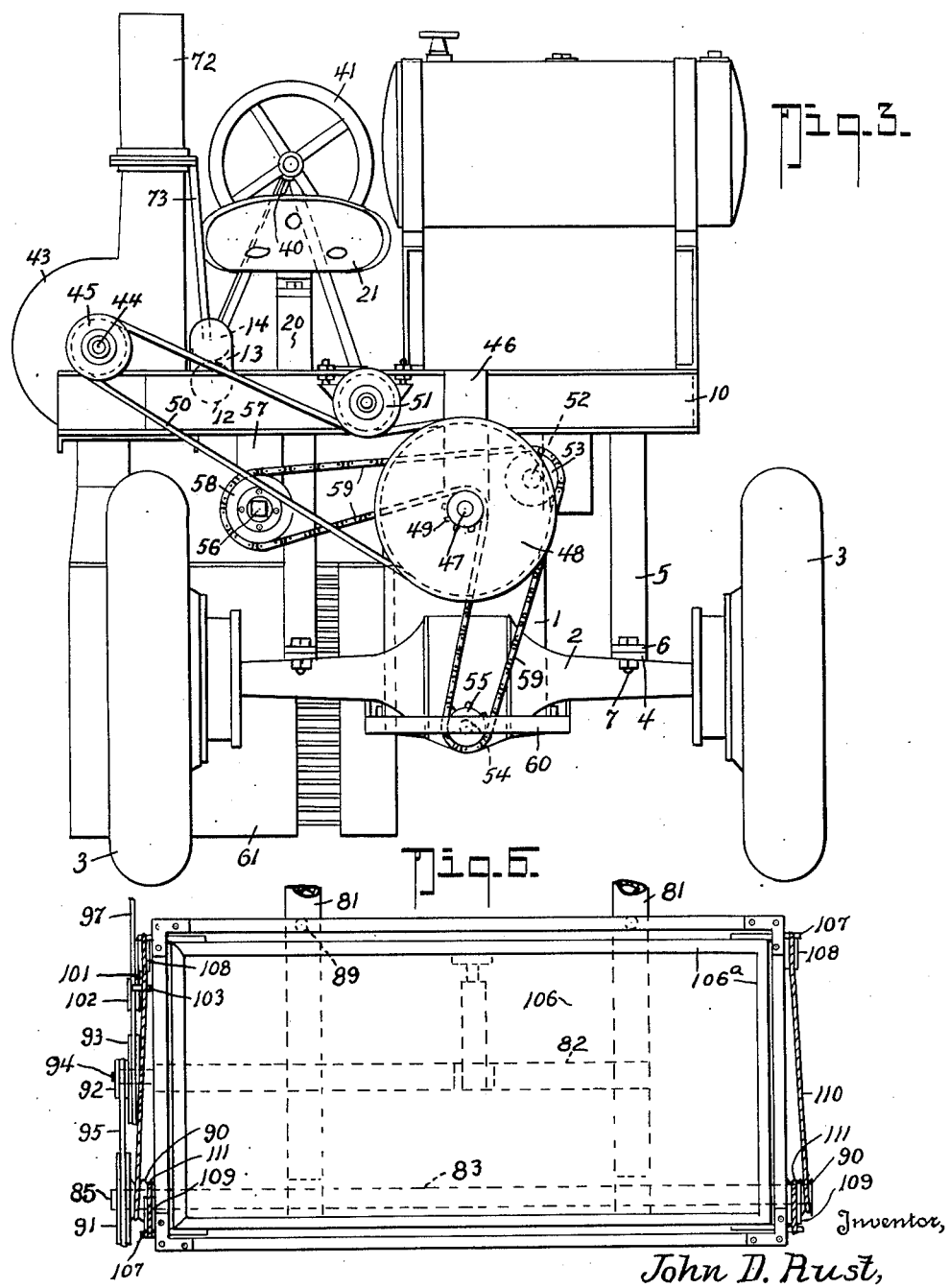

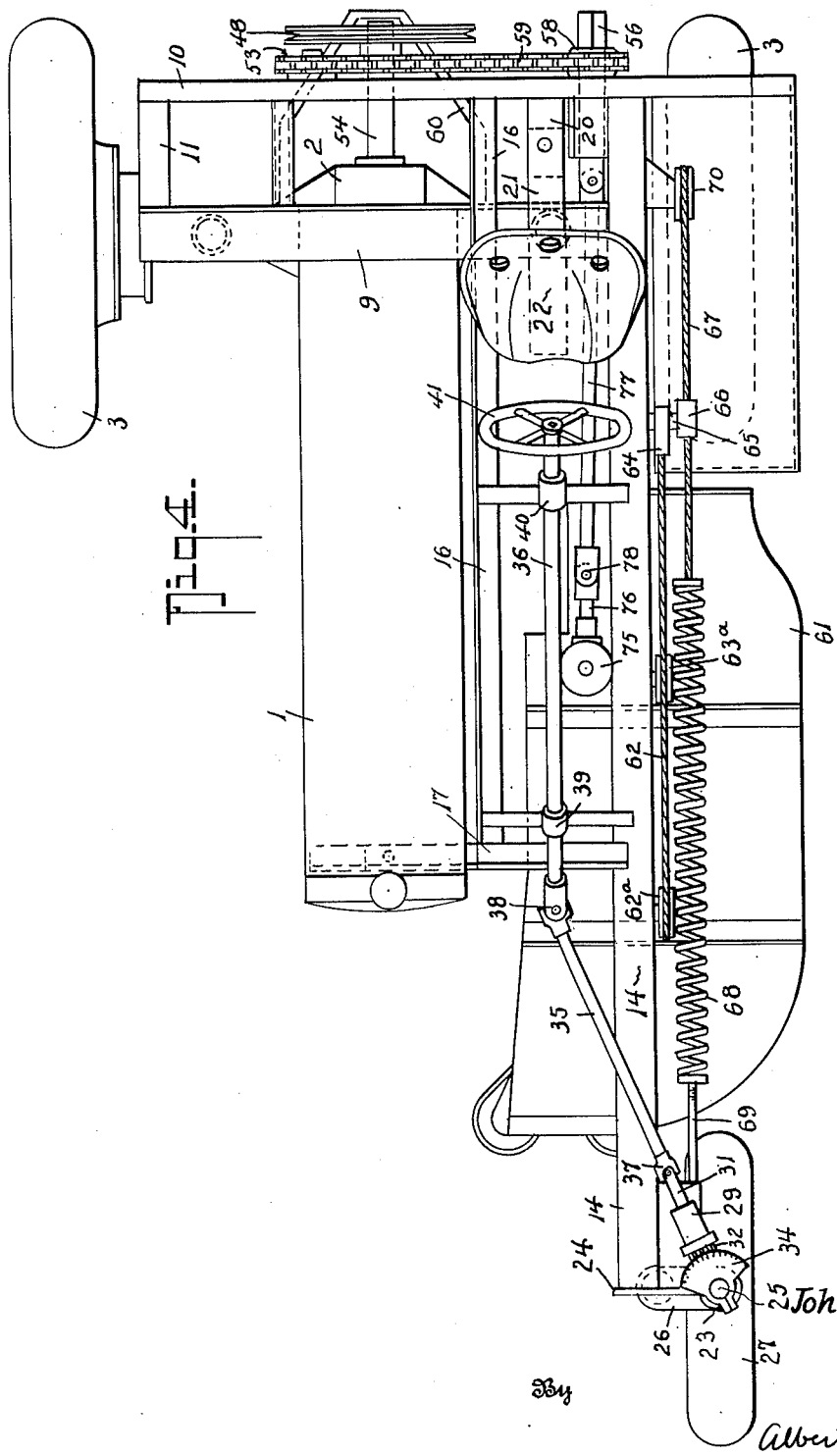

Oct. 14, 1952 J. D. RUST 2,613,492
COTTON PICKING MACHINE
Filed Oct. 25, 1948 5 Sheets-Sheet 5
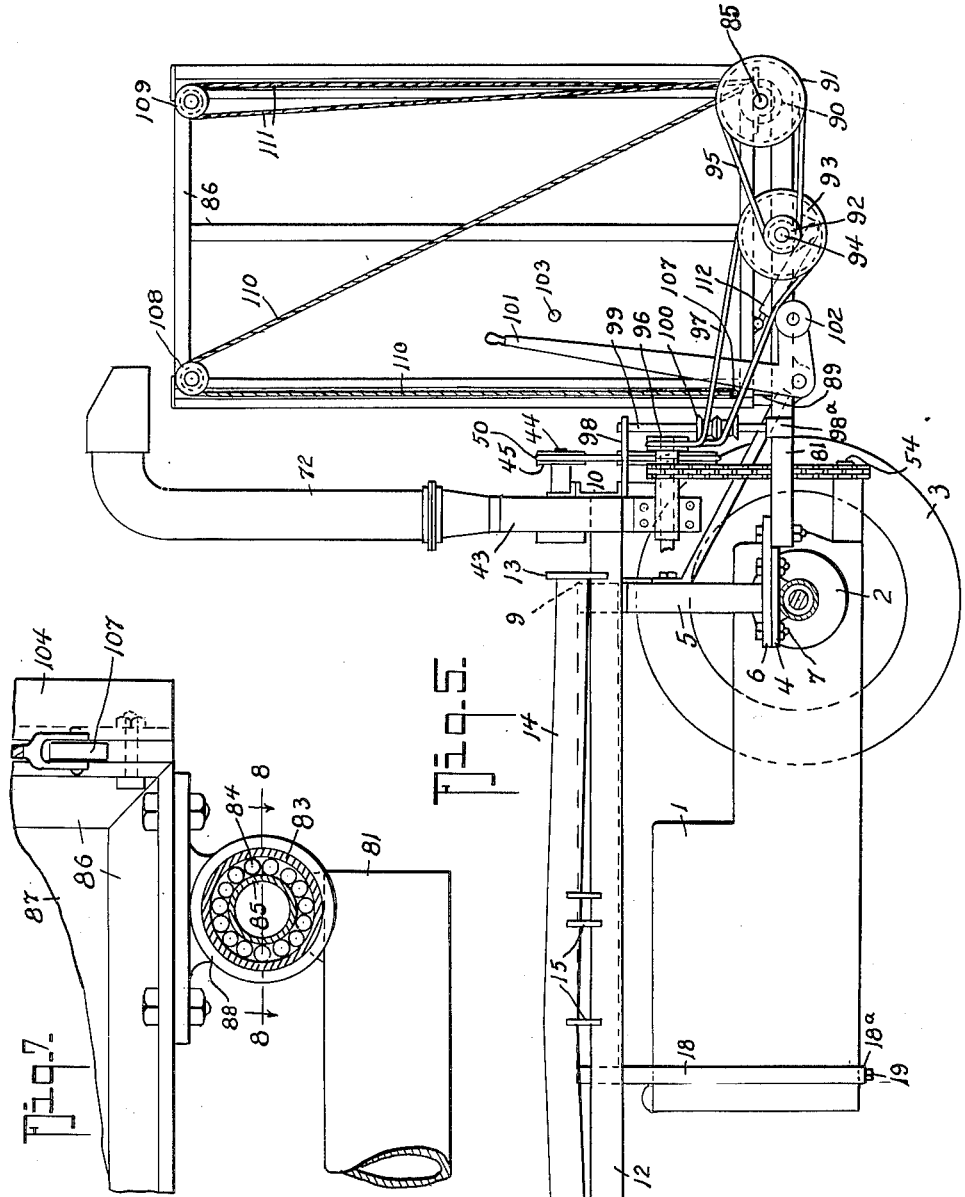
Inventor,
John D. Rust,
By Albert E. Dieterich,
ATTORNEY.

Patented Oct. 14, 1952

2,613,492

UNITED STATES PATENT OFFICE 2,613,492

COTTON PICKING MACHINE

John D. Rust, Memphis, Tenn.

Application October 25, 1948, Serial No. 56,327

12 Claims. (Cl. 56—14)

1

My invention, which relates particularly to the well known Rust type machines, has for its objects:

1. To provide a new one row picker mounting primarily for light tractors such as a "Ford," for example.
2. To provide a machine equipped with a cotton-receiving box constructed to be mounted on the tractor and dumped by the tractor power through a combination of mechanical and hydraulic means, i. e., the box is tipped backwards by a hydraulic jack operated by the pump in the tractor and then the floor of the box is raised to eject the cotton by means of cables and drums operated by a driving connection with the power take-off shaft of the tractor.

Other objects will in part be obvious and in part be pointed out hereinafter.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 2 is a front elevation of the same.

Fig. 3 is a rear elevation of the same.

Fig. 4 is a plan view of the same, parts being omitted.

Fig. 5 is a side elevational view on a reduced scale of a portion of the tractor and mounting frame showing the cotton-receiving box thereon and the mechanism for operating same with the cotton picking unit and front wheel removed.

Fig. 6 is a detail top plan view of the cotton-receiving box.

Fig. 7 is an enlarged detail elevational view showing in detail the bearing structure of a drum carrying tube.

Fig. 8 is a section on the line 8—8 of Fig. 7 showing the driven pulley and the cable drums at one side of the machine.

Figure 1:
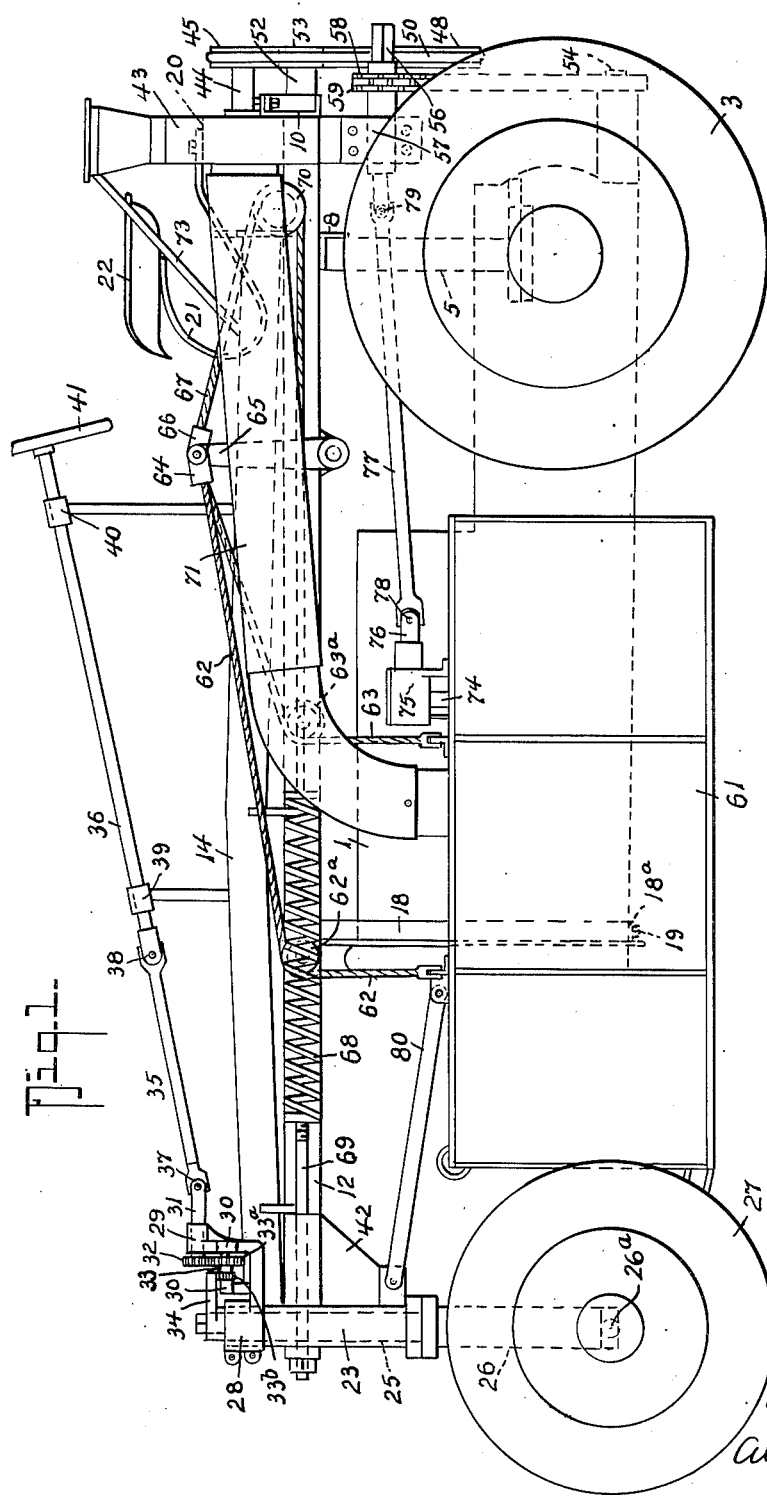
Fig. 1 is a side elevation showing the picking unit and cotton discharge parts of my machine combined with the power unit and rear wheels of a conventional farm tractor.

Referring now particularly to Figs. 1 to 4 inclusive, it will be seen that when my invention is applied to a known tractor, the front axle and wheels are removed as is also the usual steering gear. The rear axle, wheels and housing, however, are retained.

In the accompanying drawings 1 designates the tractor (from which the usual front wheels

2 and axle have been removed), 2 the rear axle housing and 3 the rear wheels.

Welded or otherwise rigidly secured to the rear axle 2 are plates 4 to which are bolted, at 7, foot plates 6 welded to the lower ends of preferably tubular supporting posts or members 5. At the top the posts 5 are welded to a cross angle beam 8 on which a second angle cross beam 9 is welded, bolted, or otherwise rigidly mounted. At the rear a cross channel iron beam 10 is secured to the beam 9 by means of a spacer 11 and by means of a lower tubular longitudinal bar or pipe 12 and extends to the front of the machine.

13 is a plate welded to the cross beam 9 to which plate one end of a second longitudinal bar or pipe 14 is welded and extends along over bar 12 to which it is connected by brace plates 15 welded to the bars 12 and 14.

Extending parallel to the bars 12 and 14 but spaced laterally from the same is a channel iron beam 16 which has its rear portion welded to the cross beams 10 and 9. At its front end the beam 16 is connected with the bars 12 and 14 by a cross beam 17. At the corner formed by the juncture of elements 16 and 17 a vertically extending depending post or arm 18 is welded to the elements 16, 17 and this post has a lateral extention 18ᵃ that lies under the front end of the tractor and is secured to the same by the bolt 19 that previously held the front axle in place. The parts 18, 18ᵃ thus act as a cradle to support the front end of the tractor.

20 indicates a post secured to the beam 10 to which post the seat carrying spring 21 for seat 22 is attached.

At the front end the bars 12 and 14 are welded to a plate 24 that is in turn welded to a vertically extending tubular pillar or support 25 in which a steering shaft 23 turns. The shaft 23 has a semi-fork 26 to the lower end of which the front ground wheel spindle 26ᵃ is secured. A single front ground wheel 27 is employed. The shaft 23 extends above the pillar 25 and has a gear-segment 34 attached to it. Below the gear segment is a bracket 28 which is securely clamped about the upper end of the pillar and has bearings 30 for a countershaft 33 carrying gears 33ᵃ, 33ᵇ. Gear 33ᵇ meshes with gear segment 34 while gear 33ᵃ meshes with a gear 32 of a short shaft 31 journalled in a bearing 29 of the bracket 28.

41 is the steering wheel whose steering rod 36 is mounted in bearing supports 39 and 40 secured to the bars 14 and 16. The rod 36 is connected to shaft 31 by an extension rod 35 and universal joints 36 and 37 respectively.

42 designates a brace plate or web joining rod 12 and plate 24 and to which a pull bar 80 is pivoted.

Mounted on the frame in front of beam 10 is a suction blower 43 having a drive shaft 44 carrying a pulley 45. A bracket 46 is also secured to beam 10 and carries a stub shaft 47 on which is journalled a sprocket 49 and attached pulley 48. A driving belt 50 passes around pulleys 45 and 48 and is tensioned by an adjustable tension pulley 51 mounted on beam 10 (Fig. 3).

52 is a stub shaft on which is journalled a sprocket 53, and over which a sprocket chain 59 passes. The chain also passes around a sprocket 55 on the power take-off shaft 54 of the tractor.

Journalled in a bearing bracket 57 is a picker drive power shaft 56 on which is a sprocket 58 around which the chain 59 passes, the chain also passing over the sprocket 49. Thus the power for operating the suction-blower 43 and the picker 61 is obtained from the usual power take-off shaft of the tractor.

A guard rail 60 protects the sprocket 55 and end of shaft 54 from injury when backing the tractor.

The picker unit 61, which is of known construction and per se not of the present invention, is suspended from the frame by cables 62, 63 that pass over pulleys 62a, 63a respectively and are secured to a clevis 64 that is pivoted to an arm 65 to which a second clevis 66 is also pivoted. A cable 67 is secured to the clevis 66 and passes around a pulley 70 and has its end fastened to a stout spring 68 which in turn is secured to a bolt 69 that passes through and is adjustably secured to the plate 24. This suspension means is also well known and is per se not a part of my present invention. The pull bar 80 connects the picker with the plate 24 and brace 42.

71 designates the usual cotton off-take duct from the picker 61 to the suction-blower 43 while 72 designates the cotton discharge duct from the suction-blower. 73 is a brace for the suction blower.

74 designates the picker drive shaft, 75 a gear box and 76 a stub shaft operatively connected with shaft 74. Shaft 76 is also connected with shaft 56 via a connecting shaft or rod 77 and universal joints 78 and 79 (see Fig. 1).

Referring now to Figs. 5, 6, 7 and 8, it will be seen that an auxiliary frame composed of rearwardly extending bars or tubes 81 which bars are secured to the plates 6 and are connected by a cross bar 82 intermediate the ends of the bars 81. On the rear ends of the bars 81 is welded a tubular shaft 83 (Fig. 7) on the extremities of which are pivot-bearing brackets 88 attached to the rear corners of a rectangular box frame 86. Within the ends of the shaft 83 are ball bearings 84 which support a second shaft 85 that passes through shaft 83 and has mounted on its extended ends, duplex drums 90, and on one end a pulley 91. The box has side and end panels 87 of any suitable material and is provided with a movable bottom 106 whose frame 106a at each corner has attached thereto short rods 107 which project through vertical slots 104 in the sides of the box frame 86.

The front of the frame 86 has feet 89 to rest on the bars 81 normally.

Mounted to turn on a stub shaft 94 projecting from the bar 82 is a duplex pulley 92, 93 over the smaller one 92 of which and over pulley 91 a driving belt 95 is passed.

Secured on the picker power shaft 56 is a pulley 96 around which, over guide pulleys 100 and around pulley 93 a driving belt 97 passes. The guide pulleys 100 are mounted on a shaft 99 journalled in bearings 98, 98a. A belt tightener bell crank lever 101 has a roller 102 that may be forced into contact with the belt 97 to tighten it when it is desired to drive the drums 90. A stop 103 limits to return movement of lever 101. Mounted at the four upper corners of the box are pulleys 108 and 109, the pulleys 108 being at the front and the pulleys 109 at the rear of the box. Cables 110 connect the front rods 107 with one section of the drums 90 while cables 111 connect the rear rods 107 with the other section of the drums 90, the cables 110 and 111 respectively passing over the pulleys 108 and 109.

When power is applied via lever 101 to drive the drums, the floor or box bottom 106 will be elevated to eject the contents of the box.

Below the box is mounted a hydraulic jack 112 which is used to rock the box on its pivot and tilt the box backward so that as the cotton is ejected it will spill over the rear of the box into a suitable collection vehicle that may be provided to receive the cotton.

From the foregoing description and from a view of the drawings it will be seen that the wheel 27 is in alignment with one of the rear wheels 3 and the picker is slung between the tractor and the wheels 27, 3 and below the frame. This gives a more perfect distribution of the weight and enables short turns to be made.

Likewise the receiving box provides a convenient way to hold the cotton while the machine is traveling over the field and a power operated means to discharge the cotton when the box is full.

From the foregoing description, taken in connection with the accompanying drawings, it is thought that the construction, operation and advantages of the invention will readily appear to those skilled in the art.

What I claim is:

1. A cotton picking machine comprising a carrying frame for use with a tractor, said carrying frame having a cotton picking unit suspended therefrom intermediate its ends, a front ground wheel mounted on the forward end of said frame, the rear end of said carrying frame having a pair of spaced supporting members detachably secured to the axle housing of the tractor and means on said carrying frame intermediate its ends for detachably securing the forward end of the tractor.

2. A cotton picking machine comprising a carrying frame for use with a tractor, said carrying frame having a cotton picking unit suspended therefrom intermediate its ends, a front wheel pivotally mounted on the forward end of said frame, the rear end of said carrying frame provided with a pair of spaced supporting members detachably secured to the axle housing of the tractor, depending means mounted on said carrying frame adjacent the forward end thereof for detachably securing the forward end of the tractor and a steering mechanism on said carrying frame operatively connected to said front wheel.

3. A cotton picking machine comprising a carrying frame for use with a tractor, said carrying frame having a cotton picking unit suspended therefrom intermediate its ends, a support secured to the forward end of said frame, a front wheel pivotally mounted in said support, the rear end of said carrying frame provided with a pair of spaced supporting members detachably secured to the axle housing of the tractor, depending means mounted on said carrying frame adjacent the forward end thereof for detachably securing the forward end of the tractor, a steering mechanism on said carrying frame operatively connected to said front wheel and driving mechanism supported on said carrying frame operatively connecting said cotton picking unit with the tractor.

4. A cotton picking machine comprising a carrying frame for use with a tractor, said carrying frame having a cotton picking unit suspended therefrom intermediate its ends, a steering post pillar secured to the forward end of said frame, a shaft journalled in said pillar, a front ground wheel carried by said shaft, a steering wheel mounted on said carrying frame, the rear end of said carrying frame provided with a pair of spaced supporting members detachably secured to the axle housing of the tractor, a depending arm mounted on said carrying frame adjacent the forward end thereof for detachably securing the forward end of the tractor and means supported on said carrying frame and operatively connecting said steering wheel with said shaft.

5. A cotton picking machine comprising a carrying frame for use with a tractor, said carrying frame having a cotton picking unit suspended therefrom intermediate its ends, said carrying frame including a transversely extending portion at one end thereof, a front ground wheel pivotally mounted on the other end of said carrying frame, a pair of spaced supporting members affixed to said portion of the carrying frame and detachably secured to the axle housing of the tractor, a depending arm mounted on said carrying frame adjacent one end thereof for detachably securing the forward end of the tractor and a steering mechanism on said carrying frame operatively connected to said front wheel.

6. A cotton picking machine comprising a carrying frame for use with a tractor, said carrying frame including a pair of spaced members joined together at spaced intervals throughout their length and a transversely extending portion secured to one end of said spaced members, a vertically extending steering post pillar secured to the other end of said spaced members, a steering shaft journalled in said pillar, a front ground wheel carried by said shaft, one of said spaced members having a cotton picking unit suspended therefrom intermediate its ends, the transversely extending portion of said carrying frame provided with a pair of spaced supporting members detachably secured to the axle housing of the tractor, a depending arm mounted on said carrying frame adjacent one end thereof for detachably securing the forward end of the tractor and a steering mechanism on said carrying frame operatively connected to said steering shaft.

7. A cotton picking machine comprising a carrying frame for use with a tractor, said carrying frame including a pair of spaced members joined together at spaced intervals throughout their length and a transversely extending portion secured to one end of said spaced members, a steering post pillar secured to the other end of said spaced members, a steering shaft journalled in said pillar, a front ground wheel carried by said shaft, one of said spaced members having a cotton picking unit suspended therefrom intermediate its ends, the transversely extending portion of said carrying frame provided with a pair of spaced supporting members detachably secured to the axle housing of the tractor, a bracket secured to the transversely extending portion of the carrying frame, a cotton picking unit drive shaft supported by said bracket, a sprocket mounted on said drive shaft, a depending arm mounted on said carrying frame adjacent one end thereof for detachably securing the forward end of the tractor, a steering mechanism on said carrying frame operatively connected to said steering shaft and driving mechanism operatively connecting said sprocket with the tractor.

8. A cotton picking machine comprising a carrying frame for use with a tractor, said carrying frame having a cotton picking unit suspended therefrom intermediate its ends, a cotton receptacle mounted on said frame, a front ground wheel pivotally mounted on the forward end of said frame, the rear end of said carrying frame having a pair of spaced supporting members detachably secured to the axle housing of the tractor and means on said carrying frame intermediate its ends for detachably securing the forward end of the tractor.

9. A cotton picking machine comprising a carrying frame for use with a tractor, said carrying frame having a cotton picking unit suspended therefrom intermediate its ends, a cotton receptacle mounted on said frame, a front ground wheel pivotally mounted on the forward end of said frame, the rear end of said carrying frame provided with a pair of spaced supporting members detachably secured to the axle housing of the tractor, depending means mounted on said carrying frame adjacent the forward end thereof for detachably securing the forward end of the tractor and a steering mechanism on said carrying frame operatively connected to said front wheel.

10. A cotton picking machine comprising a carrying frame for use with a tractor to provide a self propelled cotton picker, said carrying frame including a laterally extending portion at one end thereof, said laterally extending portion and said end of said frame provided with spaced supporting members adapted to detachably secure said carrying frame to the axle of the tractor, a dirigible wheel supporting member adjacent the other end of said carrying frame, a depending member extending laterally from said carrying frame intermediate the ends thereof and having means adapted to support the forward end of the tractor, said depending member extending from the same side of the carrying frame as said laterally extending portion and a cotton picking unit suspended from said frame intermediate its ends.

11. A cotton picking machine comprising a carrying frame for use with a tractor to provide a self propelled cotton picker, said carrying frame including a laterally extending portion at one end thereof, said laterally extending portion and said end of said frame provided with spaced supporting members adapted to detachably secure said carrying frame to the axle of the tractor, a cotton receptacle mounted on said frame, a wheel supporting member adjacent the other end of said carrying frame, a depending member extending laterally from said carrying frame intermediate the ends thereof and having means adapted to support the forward end of the tractor, said depending member extending from the same side of the carrying frame as said laterally extending portion and a cotton picking unit suspended from said frame intermediate its ends.

12. A cotton picking machine comprising a carrying frame for use with a tractor to provide a self-propelled cotton picker, said carrying frame including a laterally extending portion at one end thereof, said laterally extending portion and said end of said frame provided with spaced supporting members adapted to detachably secure said carrying frame to the axle of the tractor, a cotton receptacle mounted on said frame, a dirigible wheel supporting member adjacent the other end of said carrying frame, a depending member extending laterally from said carrying frame intermediate the ends thereof and having means adapted to support the forward end of the tractor, said depending member extending from the same side of the carrying frame as said laterally extending portion, a cotton picking unit suspended from said frame intermediate its ends and mechanism on said carrying frame for steering said wheel.

JOHN D. RUST.

REFERENCES CITED

The following references are of record in the file of this patent:

UNITED STATES PATENTS

| Number | Name | Date |
|---|---|---|
| 766,866 | Bendickson | Aug. 9, 1904 |
| 1,321,258 | Stinson | Nov. 11, 1919 |
| 1,348,003 | Hartsough | July 27, 1920 |
| 1,371,312 | Krotz | Mar. 15, 1921 |
| 1,545,167 | Opitz | July 7, 1925 |
| 1,892,865 | Brown | Jan. 3, 1933 |
| 1,972,680 | Cushman | Sept. 4, 1934 |
| 2,073,653 | Rust et al. | Mar. 16, 1937 |
| 2,214,818 | Johnston | Sept. 17, 1940 |
| 2,234,599 | Johnston | Mar. 11, 1941 |
| 2,352,291 | Scarrott et al. | June 27, 1944 |
| 2,409,302 | Millikin | Oct. 15, 1946 |